United States Patent [19]

Oishi et al.

[11] 4,404,795

[45] Sep. 20, 1983

[54] METHOD OF AND APPARATUS FOR REDUCING EMITTED AMOUNT OF PARTICULATES CONTAINED IN EXHAUST GAS OF DIESEL ENGINE

[75] Inventors: Kiyohiko Oishi, Susono; Yoshihiro Suzuki, Toyota; Kiyoshi Kobashi, Mishima; Shinichi Matsumoto, Toyota; Takashi Yoshida, Nagoya; Takeshi Kogiso, Aichi, all of Japan

[73] Assignees: Toyota Jidosha Kogyo Kabushiki Kaisha; Kabushiki Kaisha Toyota Chuo Kenkyusho, both of Aichi, Japan

[21] Appl. No.: 272,956

[22] Filed: Jun. 12, 1981

[30] Foreign Application Priority Data

Jun. 19, 1980 [JP] Japan .................................. 55-83176

[51] Int. Cl.³ ............................................. F01N 3/02
[52] U.S. Cl. ......................................... 60/274; 55/282; 55/466; 55/DIG. 10; 55/DIG. 30; 60/289; 60/303; 60/311
[58] Field of Search ................. 60/274, 284, 286, 289, 60/303, 311, 300; 55/DIG. 30, 282, 466, DIG. 10

[56] References Cited

U.S. PATENT DOCUMENTS

| | | | |
|---|---|---|---|
| 3,911,675 | 10/1975 | Mondt | 60/286 |
| 4,211,075 | 7/1980 | Ludecke | 60/303 |
| 4,281,512 | 8/1981 | Mills | 55/DIG. 30 |
| 4,326,378 | 4/1982 | Sweeney | 60/298 |
| 4,345,431 | 8/1982 | Suzuki | 60/286 |

*Primary Examiner*—Douglas Hart
*Attorney, Agent, or Firm*—Parkhurst & Oliff

[57] ABSTRACT

This invention provides improvements in method of and apparatus for reducing an emitted amount of particulates by collecting the particulates contained in the exhaust gas from a diesel engine by a trapper. According to the invention, firstly, an excess amount of the particulates which have adhered to the trapper is detected, and thereafter, temperature of the trapper being within a range of self-burning temperature of the particulates is detected. When necessity for regenerating the trapper is ascertained based on the both detections described above, the inlet side of the trapper is heated to a range of igniting temperature of the particulates, whereby a large igniting energy required for propagating combustion is accumulated. Thereafter, secondary air is supplied to the trapper to ignite the particulates, and combustion is propagated to the particulates being within the range of self-burning temperature thereof by the secondary air continuously supplied, to thereby regenerate the trapper.

13 Claims, 10 Drawing Figures

METHOD OF AND APPARATUS FOR REDUCING EMITTED AMOUNT OF PARTICULATES CONTAINED IN EXHAUST GAS OF DIESEL ENGINE

BACKGROUND OF THE INVENTION

1. Field of the Invention

This invention relates to a method of and apparatus for reducing the emitted amount of particulates contained in the exhaust gas of a diesel engine, wherein the particulates such as carbon particles and the like contained in the exhaust gas are collected by a trapper provided in an exhaust system of the diesel engine to thereby clean the exhaust gas.

2. Description of the Prior Art

Although the diesel engines have a low fuel consumption rate in general, an emitted amount of the particulates that are products due to incomplete combustion in the exhaust gas is high, and hence, it is necessary to emit the exhaust gas in a condition where the aforesaid particulates have been eliminated.

There has heretofore be known such a method that a trapper having, as its principal element, a trapping member consisting of a porous material is mounted in an exhaust system of a diesel engine, whereby the particulates are caused to adhere to the trapping member to be caught therein. In the conventional method of collecting the particulates of the type described, the pressure loss of the exhaust gas in the exhaust system increases along with the increase in amount of the particulates which have adhered to the trapping member, thus resulting in decreased output of the diesel engine. Consequently, it is required to replace or regenerate the trapper every running distance of several hundred kilometers. However, the trapper is preferably regenerated because the replacement of the trapper is uneconomical.

Heretofore, there has been commonly practised such a trapper regenerating method that an auxiliary burner including an air-fuel blowing nozzle and igniting means is operated whenever necessary to burn the particulates which have adhered to the trapping member. In other words, this is a method in which the particulates which have adhered to the trapping member are completely burned to be gasified. However, the particulates are hard to be ignited and burned, and, even when the secondary air is introduced for propagating combustion by use of the auxiliary burner, about 10 minutes are required to regenerate a trapper having a length of 100 (mm). Moreover, this method requires a large supply of fuel for the operation of the auxiliary burner, thereby reducing a merit in fuel consumption rate to be obtained in diesel engines. Further, it is not desirable to mount the auxiliary burner in the exhaust system as in this method.

SUMMARY OF THE INVENTION

The present invention has been developed to obviate the above-described disadvantages and has as its object the provision of a method of and an apparatus for reducing the emitted amount of the particulates contained in the exhaust gas of a diesel engine, in which the particulates which have adhered to the trapping member can be burned by their own heat of combustion.

To achieve the above-described object, according to the present invention, in the method of reducing the emitted amount of the particulates contained in the exhaust gas of a diesel engine for introducing the exhaust gas of the diesel engine into a trapper and causing the particulates contained in the exhaust gas to adhere to a trapping member to be collected, an excess amount of the particulates which have adhered to the trapping member is detected, temperature of the trapping member being within a range of self-burning temperature of the particulates depending on the aforesaid adhering amount is detected, the trapping member disposed at the inlet side of a trapper container is heated to a range of igniting temperature of the particulates, the secondary air is supplied into the trapper container and ignite the particulates and a combustion is propagated to the particulates which have adhered to the trapping member disposed from the inlet side to the outlet side of the trapping member to thereby regenerate the trapper. The self-burning temperature of the particulates is defined by the temperature over which the particulates continue to be burned without any additional heat.

The apparatus according to the present invention is of such an arrangement that, in an apparatus for reducing the emitted amount of the particulates contained in the exhaust gas of a diesel engine, in which the exhaust gas of the diesel engine is introduced into the trapper and the particulates contained in the exhaust gas are caused to adhere to a trapping member to be collected, the apparatus comprises: adhering particulate amount detecting means for detecting an excess amount of the particulates which have adhered to the trapping member; temperature detecting means for detecting the temperature of the trapping member within the range of self-burning temperature of the particulates depending on the aforesaid adhering amount; heating means for heating the trapping member disposed at the inlet side of the trapper container to the region of igniting temperature of the particulates; and secondary air supplying means for supplying secondary air into the trapper container; whereby the particulates which have adhered to the trapping member disposed at the inlet side of the trapper container are ignited to propagate combustion to the particulates trapped from the inlet side to the outlet side of the trapper, thereby enabling to regenerate the trapper.

DESCRIPTION OF THE PREFERRED EMBODIMENT

Detailed description will hereunder be given of the principles of the present invention. The particulates in a diesel engine include some amount of hydrocarbon in addition to carbon particles. In order to make it possible to process the particulates produced under every conditions of operation of the diesel engine, it is necessary to heat the trapping member to above 600 (°C.) which is within the range of igniting temperature of the particulates and supply the secondary air. In order to heat the trapping member to above 600 (°C.), it is necessary to provide a considerably large heat source in consideration of radiation of heat. Particularly, in the case of using a conventional burner for a heat source, air for the burner and secondary air for burning the particulates are required and further a large heat source becomes necessary.

Since the particulates generate heat of about 8 (kcal/g) while burning, if it is possible to heat the trapping member, the particulates which have adhered to the trapping member and the like to above 600 (°C.) by use of the heat generated by the burning particulates, then the particulates can be burned by the necessary least heat source. In view of the above, the present inventors have based their invention on that the trapping member disposed at the inlet side of the trapper container is heated to above 600 (°C.) to make the particulates which have adhered to the trapping member ignitable, and thereafter, a suitable amount of secondary air is introduced into the trapper container, so that a burning portion can be successively propagated in a surface scale from the ignited portion of the particulates to a portion of the particulates which have adhered to the trapping member disposed downstream of the ignited portion thereof.

The followings are the conditions for causing the combustion propagating phenomenon of the particulate which have adhered to the above-described trapping members to take place.

Figure 1:
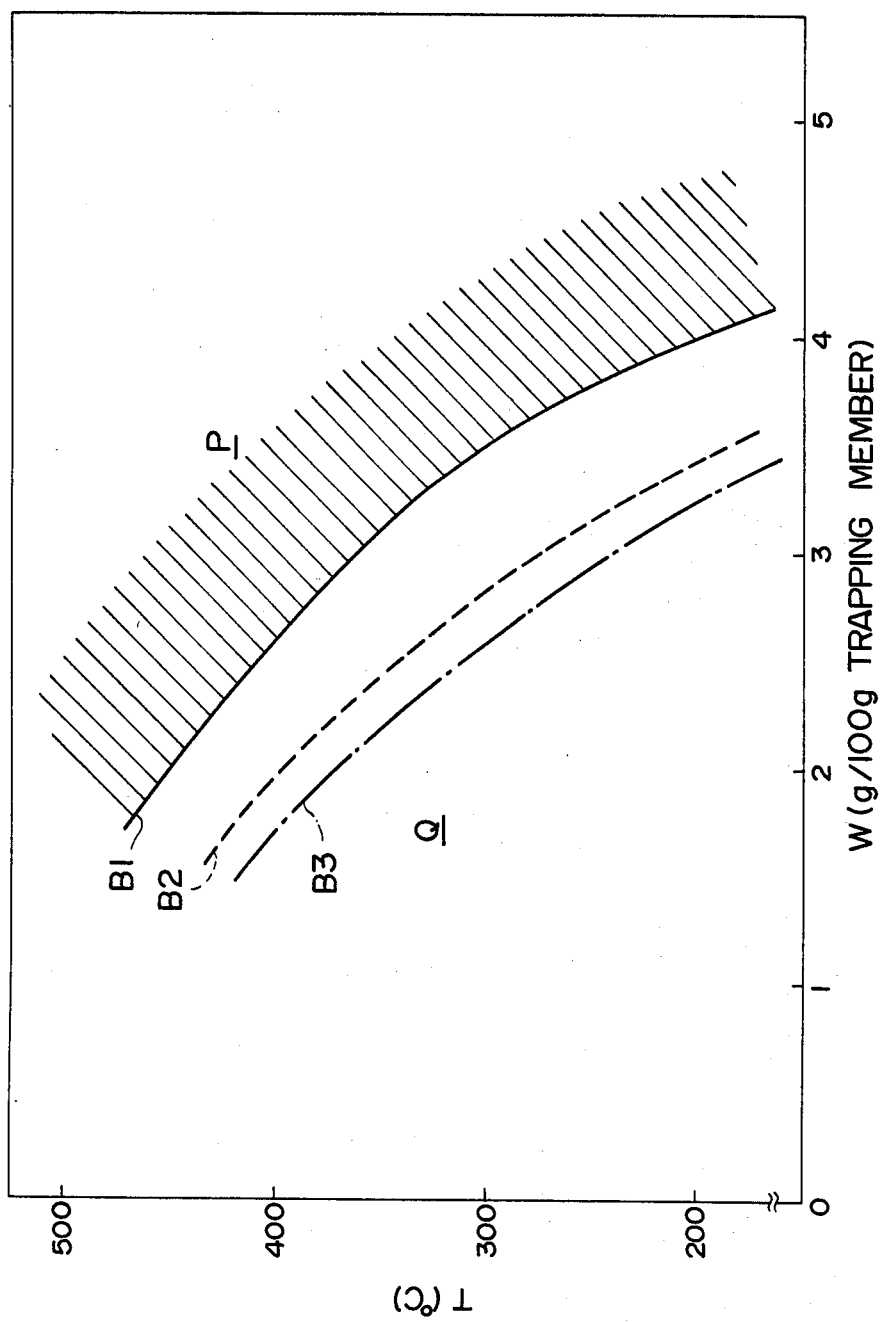
FIG. 1 is a characteristics curve diagram showing a range of combustion propagation of the particulates which have adhered to the trapping member.

A first condition is that the whole of the particulates which have adhered to the trapping member in the trapper container is within a region of combustion propagation. More particularly, (1) because of necessity for heating the trapping member to above 600 (°C.) by combustion heat of the particulates, the amount of the particulates which have adhered should exceed a predetermined value relative to the weight of the trapping member, and (2) it is necessary that the temperature of preheated particulates should be within the range of combustion temperature of the particulates in the aforesaid adhering amount in proportion to a ratio of the adhering amount of the particulate to the weight of the trapping member as shown in region P of combustion propagation in FIG. 1. FIG. 1 is a characteristics curve diagram showing that adhering amount W of the particulates (g/100 g of the trapping member of ceramic foam) is plotted as abscissa and temperature T (°C.) of the trapping member as ordinate, whereby one side of border line $B_1$ becomes the region P of combustion propagation and the other region Q of non-propagation of combustion. This trapping member can be preheated through control of operation of the diesel engine. Additionally, in FIG. 1, the border line $B_1$ for defining the region P of combustion propagation has fluctuations to some extent due to a heating system, heat retaining conditions, amount of secondary air supplied and the like. It has been ascertained that the border line $B_1$ can be lowered to border line $B_2$ by having a ceramic foam constituting the trapping member carrying therein a catalyst of vanadium pentoxide, and, when the ceramic foam carries therein palladium, the border line can be lowered to borderline $B_3$.

A second condition is that, to heat the trapping member to the range of igniting temperature, neither exhaust gas flow nor secondary air flow should be formed in a location thus heated. In other words, it is necessary that the secondary air retaining an igniting energy sufficiently large to propagate combustion to the trapping member disposed downstream should be supplied to the trapping member disposed at the inlet side of the trapping member. Therefore, the secondary air is required to be supplied after the trapping member disposed at the inlet side of the trapper container has been heated to above 600 (°C.) which is within the range of igniting temperature of the particulates. As a result, the particulates in the location thus heated are rapidly oxidized and burned to generate heat, and this heat of combustion is turned into an oxidizing energy for the particulates disposed downstream so that combustion can be successively propagated from the inlet side to the outlet side of the trapper container. In contrast thereto, when the trapping member disposed at the inlet side of the trapper container is heated while the secondary air and the like are introduced thereinto, only a portion of the particulates heated to a high temperature is slowly burned so that the location thus heated cannot retain an igniting energy large enough to propagate the particulates disposed downstream.

Description will hereunder be given of the embodiments of the present invention will reference to the drawings.

Figure 2:
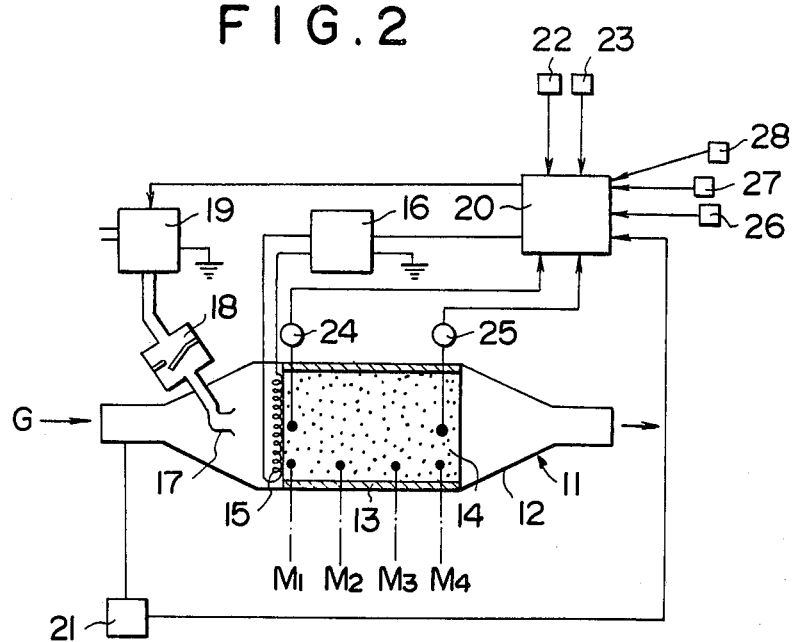
FIG. 2 is a diagram of piping showing a first embodiment of the present invention.

FIG. 2 is an explanatory view showing a first embodiment of the present invention. A trapper 11 provided in an exhaust system of a diesel engine is constructed such that a trapping member 14 is housed in a metallic trapper container 12 through a heat insulating material 13 such as rock wool and the like. The trapping member 14 is made of a heat resistant porous material such as a ceramic foam wherein, for example, 51% $SiO_2$, 35% $Al_2O_3$ and 14% MgO are sintered into a three-dimensional network. The trapping member 14 is adapted to cause the particulates contained in the exhaust gas as a byproduct due to incomplete combustion to adhere thereto, thereby enbling to collect and remove therefrom same. An electric heater 15 is provided in front of and in contact with the trapping member 14 disposed at the inlet side of the trapper container 12, and made operable by a heater controller 16. A secondary air feeding pipe 17 is disposed and open upstream of the electric heater 15 at the inlet side of the trapper container 12, and connected to a secondary air feeding pump 19 through a check valve 18 for preventing the backflow of the exhaust gas.

The heater controller 16 and the secondary air feeding pump 19 are made operable in response to an actuating command signal fed from a computer 20. The computer 20 compares a measured backpressure value of a backpressure sensor 21 connected to the inlet side of the trapper container 12 with an allowable backpressure value defined by a rotational speed 22 of the engine and an opening 23 of an accelerator lever, and, indirectly detects an excess amount of the particulates which have adhered to the trapping member 14 when the measured backpressure value exceeds the allowable backpressure value. Further, the computer 20, based on a detecting value from a temperature sensor 24 inserted into the trapping member 14 disposed at the inlet side of the trapper container 12, detects whether the temperature of the trapping member 14 is within the range of self-burning temperature of the particulates defined by the temperature over which the particulates continue to be burned without any additional heat depending on the adhering amount of the particulates detected in that case, and whether the portion of the trapping member 14 disposed at the inlet side of the trapper container 12 is heated to the range of igniting temperature of the particulates by the electric heater 15. Still further, the computer 20, based a detected value from a temperature sensor 25 inserted into the trapping member 14 disposed at the outlet side of the trapper container 12, detects whether the trapping member 14 disposed at the outlet side of the trapper container 12 has reached the range of igniting temperature of the particulates and the whole of the particulates in the trapper container 12 has been burned. Yet further, the computer 20 detects an OFF condition of an engine key switch 26, a "0" condition of a vehicle speed 27 and a neutral position of a transmission 28, to thereby ascertain that the diesel engine, to which this trapper 11 is connected, is stopped in operation.

Further, the computer 20, based on its detections of the excess in the amount of the particulates which have adhered to the trapping member 14, the temperature of the trapping member 14 within the range of self-burning temperature of the particulates and the diesel engine being stopped in operation, turns the electric heater 15 on through the heater controller 16. Furthermore, the computer 20, based on its detection of the temperature of the trapping member 14 disposed at the inlet side of the trapper container 12 heated to the range of igniting temperature of the particulates, turns the secondary air feeding pump 19 on.

Figure 3:
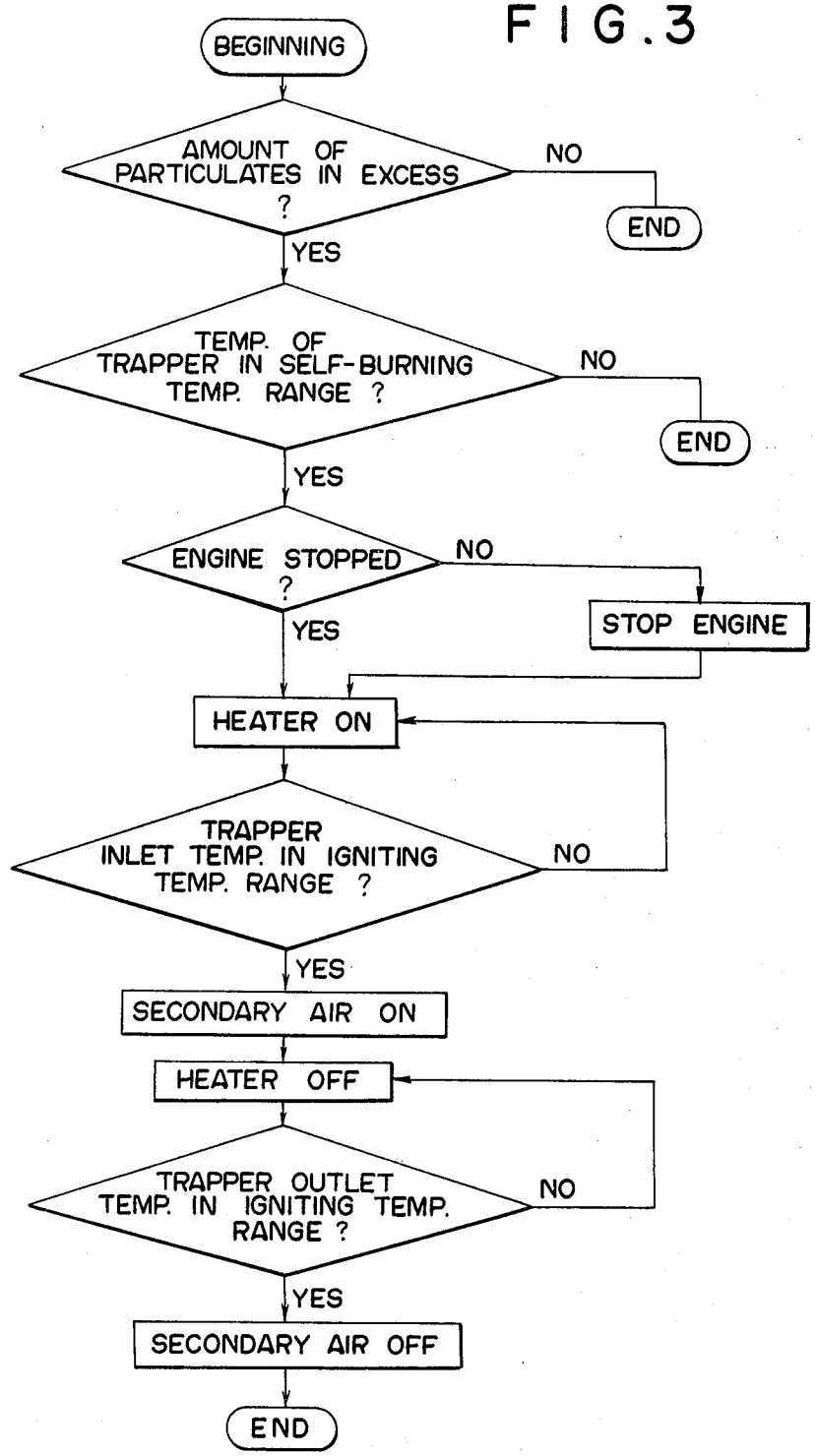
FIG. 3 is a flow chart showing the progress of operation of the first embodiment of the present invention.

Description will now be given of operation of the first embodiment described above with reference to FIGS. 3 and 4. In initiating regenerating operation for the trapper 11, the computer 20 compares the measured backpressure value of the backpressure sensor 21 at the inlet of the trapper container 12 with the allowable backpressure value defined by the rotational speed 22 of the engine and the opening 23 of the accelerator lever, to thereby indirectly detect the amount of the particulates which have adhered to the trapping member 14. The computer 20, when the adhering amount of the particulates is in excess, detects through the temperature sensor 24 whether the temperature of the trapping member 14 is within the range of self-burning temperature of the particulates depending on the adhering amount of the particulates in that case. When the adhering amount of the particulates is in excess and the temperature of the trapping member 14 is within the range of self-burning temperature of the particulates, the computer 20 ascertains that the trapper 11 is required to be regenerated and that combustion can be propagated to the particulates which have adhered to the trapping member 14. When the adhering amount of the particulates is not in excess and/or the temperature of the trapping member 14 does not reach the range of self-burning temperature of the particulates, the trapper 11 is not regenerated and remains in use. When the temperature of the trapping member 14 does not reach the range of self-burning temperature of the particulates, the trapping member 14 may be heated through operational control of the diesel engine.

When the necessity for regenerating the trapper 11 and the possibility of propagating combustion to the particulates are ascertained, the computer 20 detects the OFF condition of the engine key switch 26, the "0" condition of the vehicle speed 27 and the neutral position of the transmission 28, and ascertains the engine being stopped in operation. Under the conditions where the engine is stopped in operation and no exhaust gas flows into the trapper container 12, the computer 20 turns the electric heater 15 on through the heater controller 16. The electric heater 15 heats only the temperature of the trapping member 14 being in contact therewith in the heated location to above 600 (° C.) which is within the range of igniting temperature of the particulates, to thereby accumulate a large igniting energy required for propagating combustion to the trapping member 14 in the heated location.

When the temperature sensor 24 detects that the trapping member 14 in the heated location being heated by the electric heater 15 has reached the range of igniting temperature of the particulates, the computer 20 drives the secondary air feeding pump 19, supplies the secondary air to the inlet side of the trapping member 14 through the secondary air feeding pipe 17, and ignites the particulates which have adhered to the portion of the trapping member 14 at the inlet side. The electric heater 15 is turned off when the secondary air is supplied. The supply of the secondary air to the trapping member 14 at the inlet side, which has been heated to the range of igniting temperature of the particulates subjects the particulates disposed in that location to a rapid oxidation and burning. When the particulates in that location generate heat, this combustion heat and the secondary air being continuously supplied are conveyed to the trapping member 14 disposed downstream thereof, and combustion is successively propagated to the particulates which have adhered to the trapping member 14 disposed downstream and are within the range of self-burning temperature thereof. As described above, the burning of the particulates which have adhered to the trapping member 14 is successively propagated in a surface scale from the inlet side to the outlet side, and thereafter, upon detecting the trapping member 14 disposed at the outlet side being burned beyond the range of igniting temperature of the particulates through the temperature sensor 25, the computer 20 stops driving the secondary air feeding pump 19 to interrupt the supply of the secondary air, thus completing the regenerating operation of the trapper 11.

Figure 4:
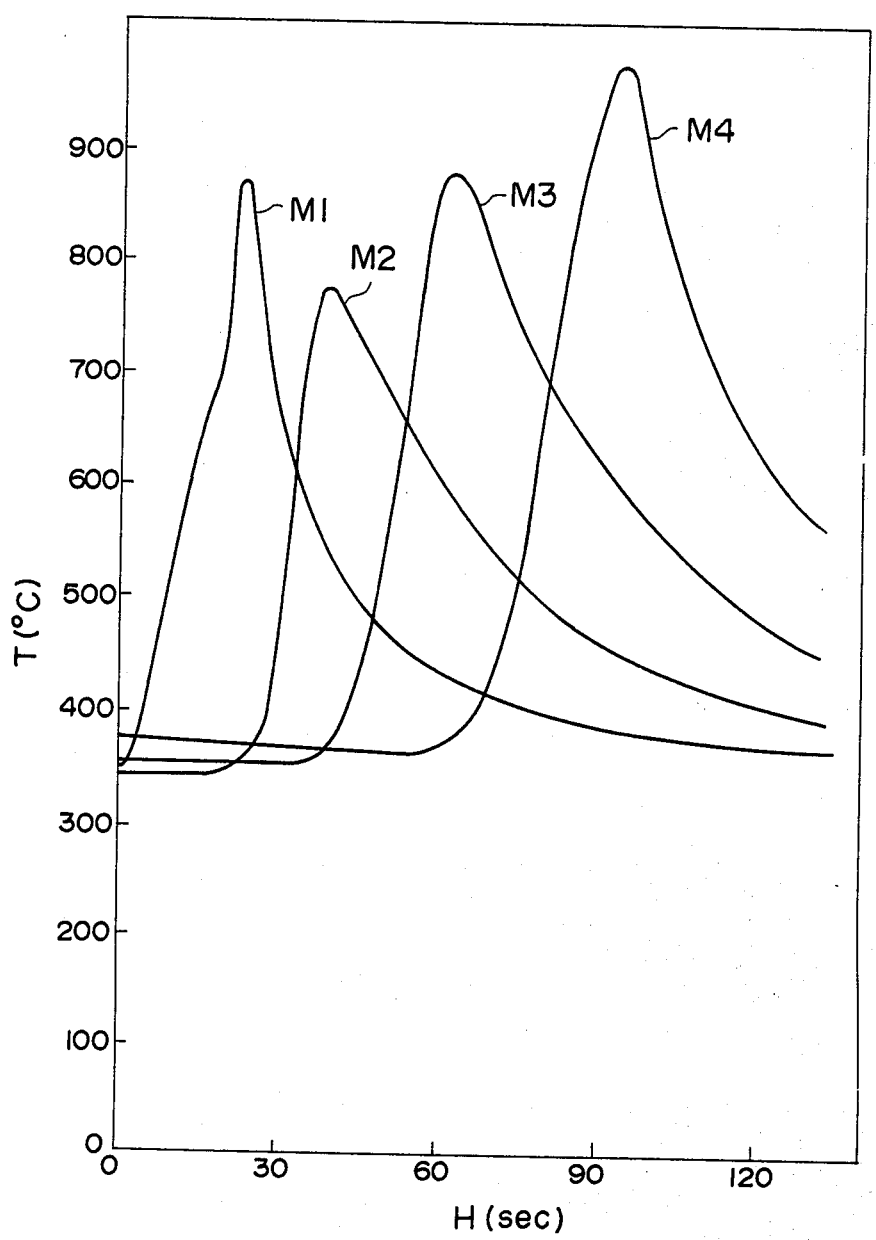
FIG. 4 is a chart showing the progress of combustion propagation in the first embodiment.

FIG. 4 shows the progress of combustion propagation of the particulates which have adhered to the trapping member 14 during operation in the first embodiment described above. In FIG. 4, time H(sec.) is plotted as abscissa and temperature T(° C.) of the trapping member 14 as ordinate, thereby enabling to ascertain that the trapping member 14 disposed at the inlet portion $M_1$, the intermediate portions $M_2$ and $M_3$ and the outlet portion $M_4$, respectively, successively reaches the temperature of burning and the burning is successively propagated.

Description will hereunder be given of the results of the experiments conducted by the present inventors based on the above-described embodiment. In the experiments the trapper 11 is determined to have the whole surface area of approx. 100 (cm$^2$) and a length of about 150 (mm). Upon starting the diesel engine, a loss in pressure due to the trapper 11 at the initial stage of operation is about 50 (mmHg) (at the time of 2000 rpm). As against the above, with the lapse of time of operation, the loss in pressure due to the trapper 11 increases. The backpressure sensor 21 detected that the loss in pressure due to the trapper 11 reached 100 (mmHg) in about 3 hours after the operation is started. Subsequently, the diesel engine was subjected to throttling for about five minutes, the temperature member 14 is elevated to 350 (° C.) which corresponds to the range of self-burning temperature of the particulates, and the engine was stopped in operation. Subsequently, the electric heater 15 was operated to elevate the temperature of a portion being sunk to a depth of about 2 (mm) from the surface of the trapping member 14 disposed at the inlet side and in contact with the electric heater 15 to 700 (° C.) exceeding the range of igniting temperature of the particulates the secondary air feeding pump 19 was driven to initiate to supply the secondary air having a flow rate of about 40 (l/min), and the electric heater 15 was turned off. It was ascertained that temperature of the air reaching the outlet of the trapping member 14 has been lowered in about five minutes after the initiation of supply of the secondary air, and the regenerating operation was completed. The diesel engine was started again under the condition where the trapper 11 has been regenerated and the engine rotational speed was set at 2000 rpm, and, it was ascertained the loss in pressure due to the trapper 11 was lowered to 56 (mmHg) and the trapper 11 was regenerated.

In the above-described first embodiment, the particulates can be burned by self-burning of the particulates which have adhered to the trapping member without additionally providing a trapping member regenerating apparatus such as an auxiliary burner or the like around the trapper 11.

Figure 5:
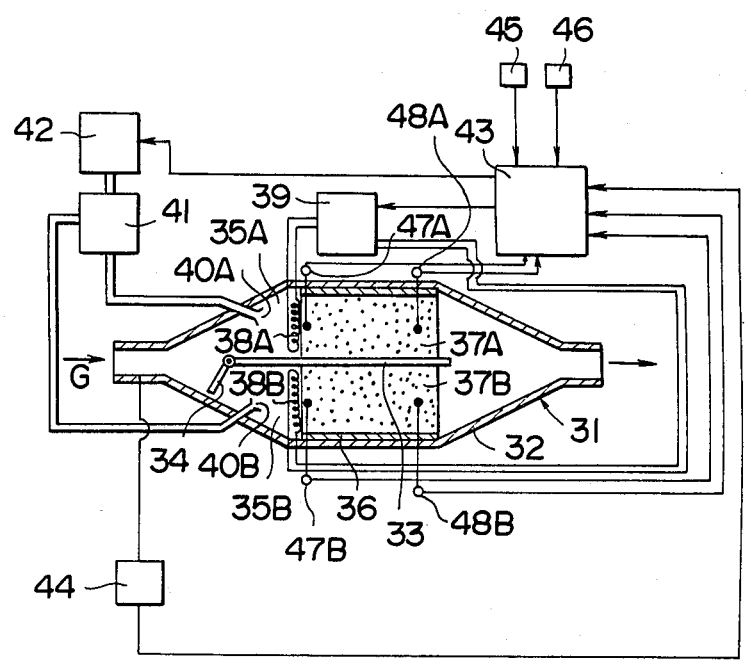
FIG. 5 is a diagram of piping showing a second embodiment of the present invention.

FIG. 5 is an explanatory view showing a second embodiment of the present invention. A trapper 31 provided in an exhaust system of a diesel engine is constructed such that a metallic trapper container 32 is provided therein with a partition wall 33 and a change-over valve 34 secured to the partition wall 33 at the inlet side thereof, whereby a first chamber 35A and a second chamber 35B are formed in parallel with an exhaust gas flow course and being separated from each other. In the first and second chambers 35A and 35B, there are respectively received trapping members 37A and 37B each made of a heat resistant porous material such as a ceramic foam, through heat insulating material 36 such as rock wool or the like. The trapping members 37A and 37B are adapted to cause the particulates contained in the exhaust gas as a byproduct due to incomplete combustion to adhere thereto, thereby enabling to collect and remove therefrom same. Electric heaters 38A and 38B are respectively provided in front of and in contact with the trapping member 37A disposed at the inlet side of the first chamber 35A and the trapping member 37B disposed at the inlet side of the second chamber 35B, and made operable by a heater controller 39. Secondary air feeding pipes 40A and 40B are respectively disposed and open upstream of the electric heaters 38A and 38B at the inlet sides of the first and second chambers 35A and 35B, and connected to a secondary air feeding pump 42 through a secondary air change-over valve 41.

The change-over valve 34, the heater controller 39 and the secondary air feeding pipe 42 are made operable in response to an actuating command signal fed from a computer 43. The computer 43 compares a measured backpressure value of a backpressure sensor 44 connected to the inlet side of the trapper container 32 with an allowable backpressure value defined by a rotational speed 45 of the engine and an opening 46 of an accelerator lever, and, indirectly detects an excess amount of the particulates which have adhered to the trapping members 37A or 37B received in the first or second chamber 35A or 35B when the measured backpressure value exceeds the allowable backpressure value. Further, the computer 43, based on a detected value from a temperature sensor 47A or 47B inserted into the portion of the trapping member 37A or 37B received by and disposed at the inlet sides of the first or second chamber 35A or 35B, detects whether the temperature of the trapping members 37A or 37B is included within the range of self-burning temperature of the particulates in the adhering amount of the particulates detected in that case, and whether the portion of the trapping member 37A or 37B disposed at the inlet side of the first or second chamber 35A or 35B is heated to the range of igniting temperature of the particulates by the electric heater 38A or 38B. Still further, the computer 43, based on a detected value from temperature sensors 48A or 48B inserted into the portions of the trapping member 37A or 37B disposed at the outlet sides of the first or second chamber 35A or 35B, detects whether the trapping member 37A or 37B disposed at the outlet side of the first or second chamber 35A or 35B has reached the range of igniting temperature of the particulates and the whole of the particulates in the first or second chamber 35A or 35B have been burned.

Further, the computer 43, based on its detections of the excess in the amount of the particulates which have adhered to the trapping member 37A or 37B received in the first or second chamber 35A or 35B each forming an exhaust gas flow course by opening of the change-over valve 34 and the temperature of the trapping member 37A or 37B being within the range of self-burning temperature of the particulates, operates the change-over valve 34 to isolate the first or second chamber 35A or 35B from the exhaust gas flow course, whereby the operation of collecting the particulates contained in the exhaust gas is switched from the first chamber 35A over to the second chamber 35B or vice versa, so that the operation of collecting the particulates is ceased in the second chamber 35B or the first chamber 35A or vice versa. Furthermore, the operation of the computer 43 is ceased through the operation of the above-described change-over valve 34, and makes the electric heater 38A or 38B ready for being turned on through the heater controller 39, the electric heater 38A or 38B being disposed at the inlet side of the first or second chamber 35A or 35B for regenerating the particulates. Further, the computer 43, based on its detection of the inlet temperature of the trapping member 37A or 37B in the first or second chamber 35A or 35B ceasing from the operation of collecting the particulates being heated to the range of igniting temperature of the particulates, makes the secondary air feeding pump 42 ready for being turned on.

Figure 6:
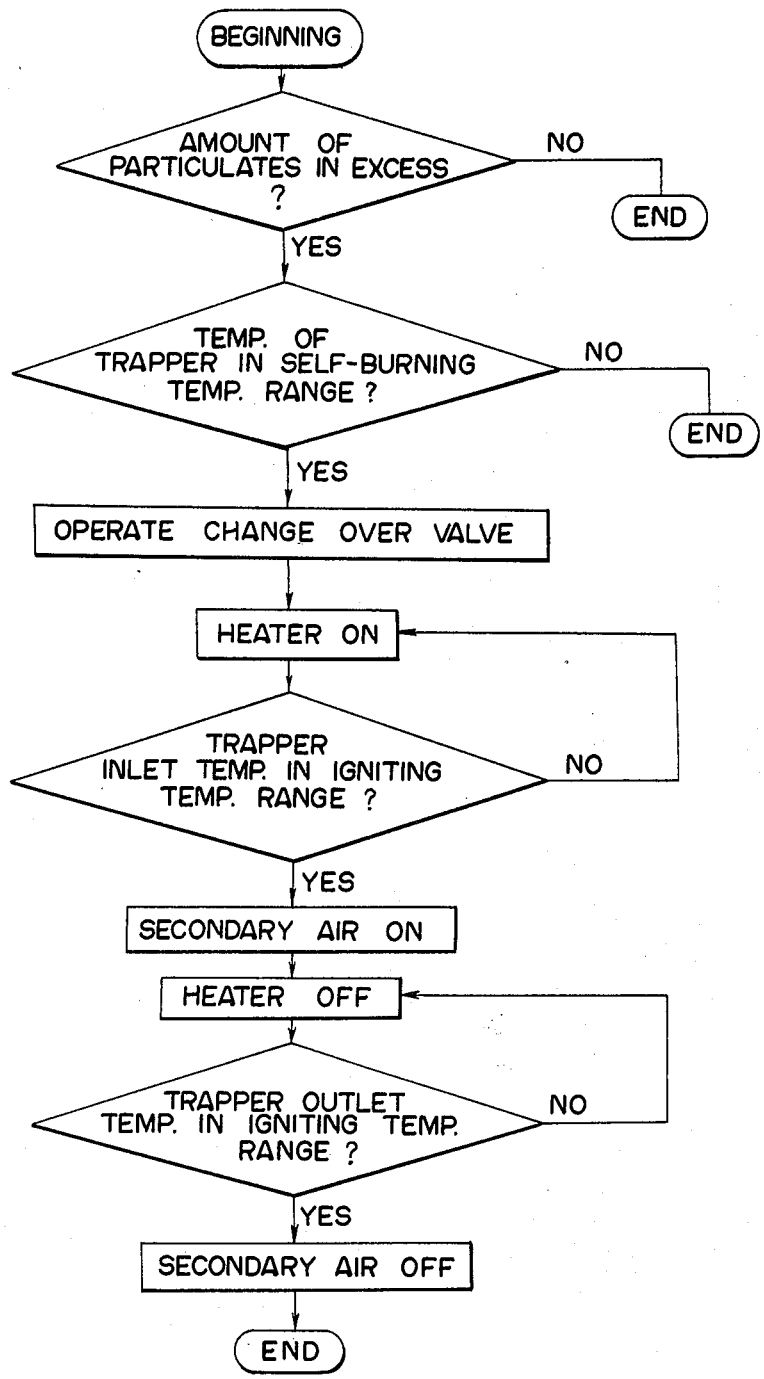
FIG. 6 is a flow chart showing the progress of operation of the second embodiment.

Description will hereunder be given of operation of the second embodiment described above with reference to FIG. 6. The exhaust gas emitted from the diesel engine initially passes through the first chamber 35A of the trapper 31 forming the exhaust gas flow course, so that the particulates contained in the exhaust gas may adhere to the trapping member 37A to be collected. In initiating regenerating operation for the trapper 31 under the above-described circumstances, a measured backpressure value in the trapper container 32, i.e., at the inlet side of the first chamber 35A measured by the backpressure sensor 44 is compared with an allowable backpressure value defined by a rotational speed 45 of the engine and an opening 46 of an accelerator lever, whereby the mount of the particulates which have adhered to the trapping member 37A is indirectly detected. When the adhering amount of the particulates is in excess, the computer 43 indirectly detects through the temperature sensor 47A whether the temperature of the trapping member 47 is within the range of self-burning temperature of the particulates. When the adhering amount of the particulates is in excess and the temperature of the trapping member 37A is within the range of self-burning temperature of the particulates, the computer 43 ascertains that the trapper 31 is required to be regenerated in the first chamber 35A and combustion can be propagated to the particulates which have adhered to the trapping member 37A. When the adhering amount of the particulates is not in excess and/or the temperature of the trapping member 37A does not reach the range of self-burning temperature of the particulates, the trapper 31 is not regenerated and remains in use. When the temperature of the trapping member 37A does not reach the range of self-burning temperature of the particulates, the trapping member 37A may be heated through operational control of the diesel engine and the like.

When the necessity for regenerating the first chamber of the trapper 31 and the possibility of propagating combustion of the particulates which have adhered to the trapping member 37A are ascertained, the computer 43 operates the change-over valve 34 to isolate the first chamber 35A from the exhaust gas flow course and bring the first chamber 35A into a condition where the regenerating operation can be performed. Here, the exhaust gas emitted from the diesel engine can be removed therefrom the particulates contained therein by the trapping member 37B in the second chamber 35B, to which the change-over valve 34 has been opened for forming a new exhaust gas flow course. Under the condition where the first chamber 35A is isolated from the exhaust gas flow course and no exhaust gas flows into the first chamber 35A, the computer 43 turns the electric heater 38A on through the heater controller 39. The electric heater 38A elevates only the temperature of the trapping member 37A being in contact therewith in the heated section to above 600 (°C.) which is within the range of igniting temperature of the particulates whereby a large igniting energy required for propagating combustion to the trapping member 37A in the heated location.

When the temperature sensor 47A detects that the trapping member 37A in the heated location has reached the region of igniting temperature of the particulates through the heating by the electric heater 38A, the computer 43 drives the second air feeding pump 42 to supply the secondary air to the inlet side of the trapping member 37A in the first chamber 35A, whereby the particulates which have adhered to the trapping member 37A disposed at the inlet side are ignited. The electric heater 38A is turned off when the secondary air is supplied.

The supply of the secondary air to the trapping member 37A disposed at the inlet side, which has been heated to the range of igniting temperature of the particulates subjects the particulates disposed in that location to a rapid oxidation and burning. When the particulates in that location generate heat, this combustion heat and the secondary air being continuously supplied are conveyed to the trapping member 37A disposed downstream thereof, and combustion is successively propagated to the particulates which have adhered to the trapping member 37A disposed downstream and are within the self-burning temperature thereof.

As described above, the burning of the particulates which have adhered to the trapping member 37A is successively propagated in a surface scale from the inlet side to the outlet side, and thereafter, upon detecting the trapping member 37A disposed at the outlet side being burned beyond the range of igniting temperature of the particulates through the temperature sensor 48, the computer 43 stops driving the secondary air feeding pump 42 to interrupt the supply of the secondary air, thus completing the regenerating operation of the trapper 31 in the first chamber 35A.

In the above-described second embodiment, the trapper container 32 of the trapper 31 is divided into two chambers including the first chamber 35A and the second chamber 35B, either one of which is alternately isolated from the exhaust gas flow course through the operation of the change-over valve 34, so that, the exhaust gas can be cleaned in one chamber while the other chamber is being regenerated. As a result, not only when the diesel engine is stopped in operation but also during operation thereof, it becomes possible to regenerate the trapper 31 by self-burning heat of the particulates.

Figure 7:
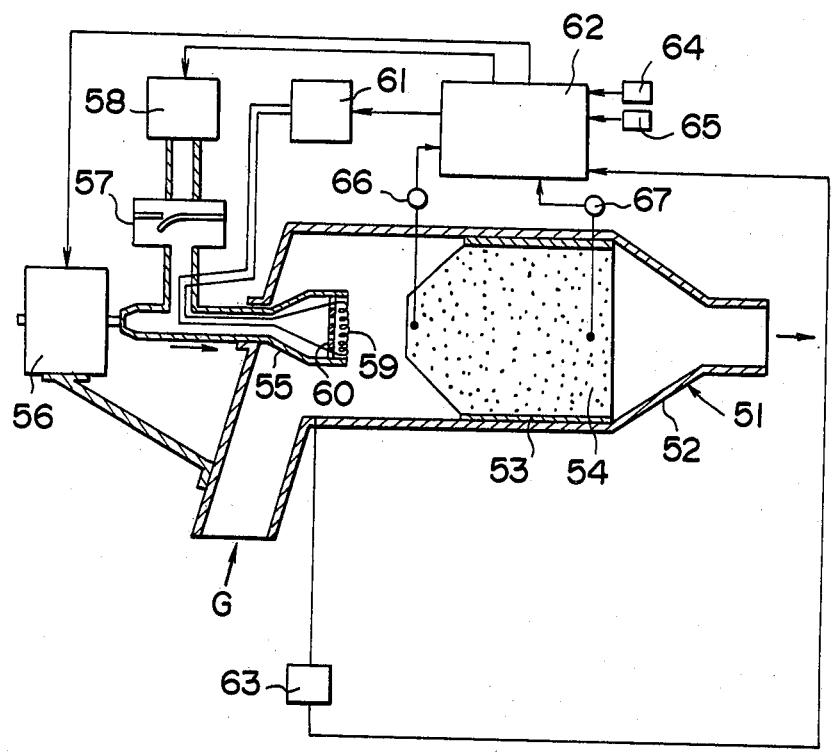
FIG. 7 is a diagram of piping showing a third embodiment of the present invention.

FIG. 7 is an explanatory view showing a third embodiment of the present invention. A trapper 51 provided in an exhaust system of a diesel engine is constructed such that a trapping member 54 made of a heat resistant porous material such as a ceramic foam is housed in a metallic trapper container 52 through a heat insulating material such as rock wool or the like. The trapping member 54 is adapted to cause the particulates contained in the exhaust gas as a byproduct due to incomplete combustion to adhere thereto, thereby enabling to collect and remove therefrom same. A secondary air feeding housing 55 is provided in front of the trapping member 54 disposed at the inlet side of the trapper container 52 and adapted to be rectilinearly movable between a receded position and an advanced position being in contact with the front face of the trapping member 54 as shown in the drawing through the driving by an actuator 56. The secondary air feeding housing 55 is connected to a secondary air feeding pump 58 through a check valve 57 for preventing the backflow of the exhaust gas. Provided at an opening of the secondary air feeding housing 55 is an electric heater 59, behind which is supported a porous member 60. The electric heater 59 is made operable by a heater controller 61.

The actuator 56, the secondary air feeding pump 58 and the heater controller 61 are made operable in response to an actuating command signal fed from a computer 62. The computer 62 compares a measured backpressure value of a backpressure sensor 63 connected to the inlet side of the trapper container 52 with an allowable backpressure value defined by the rotational speed 64 of the engine and an opening 65 of an accelerator lever, and, indirectly detects an excess amount of the particulates which have adhered to the trapping member 54 when the measured backpressure value exceeds the allowable backpressure value. Further, the computer 62, based on a detected value from a temperature sensor 66 inserted into the portion of the trapping member 54 disposed at the inlet side of the trapper container 52, detects whether the temperature of the trapping member 54 is within the range of self-burning temperature of the particulates depending on the adhering amount of the particulates, and whether the portion of the trapping member 54 disposed at the inlet side of the trapper container 52 is heated to the range of igniting temperature of the particulates by the electric heater 59. Still further, the computer 62, based on a detected value from a temperature sensor 67 inserted into the portion of the trapping member 54 disposed at the outlet side of the trapper container 52, detects whether the trapping member 54 disposed at the outlet side of the trapper container 52 has reached the range of igniting temperature of the particulates and the whole of the particulates in the trapper container 52 has been burned.

The computer 62, based on its detections of the excess amount of the particulates which have adhered to the trapping member 54 and the temperature of the trapping member 54 being within the region of self-burning temperature of the particulates, moves the secondary air feeding housing 55 from the receded position to the advanced position through the actuator 56, causes the electric heater 59, which has been relieved from the influence of the exhaust gas flow by the secondary air feeding housing, to be able to abut against the front of the trapping member 54 disposed at the inlet side, and turns the electric heater 59 on through the heater controller 61. Further, the computer 62, based on its detection of the temperature of the trapping member 54 disposed at the inlet side being heated to the range of igniting temperature of the particulates through the heating by the electric heater 59, makes the secondary air feeding pump 58 ready for being turned on.

Figure 8:
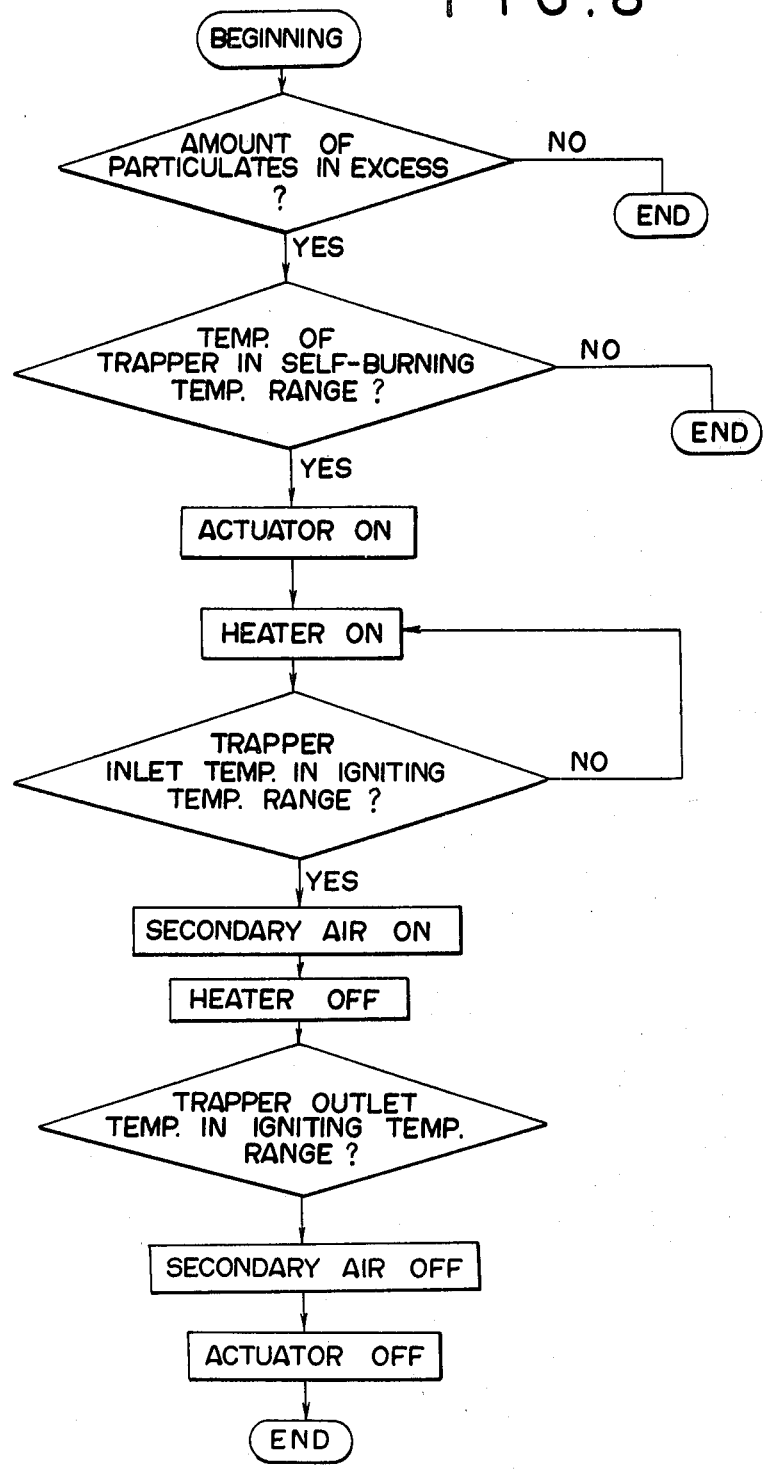
FIG. 8 is a flow chart showing the progress of operation of the third embodiment.

Description will hereunder be given of operation of the above-described third embodiment with reference to FIG. 8. In initiating regenerating operation for the trapper 11, the computer 62 compares the measured backpressure value of the backpressure sensor 63 at the inlet of the trapper container 52 with the allowable backpressure value defined by the rotational speed 64 of the engine and the opening 65 of the accelerator lever, to thereby indirectly detect the amount of the particulates which have adhered to the trapping member 54. The computer 62, when the adhering amount of the particulates is in excess, detects through the temperature sensor 66 whether the temperature of the trapping member 54 is within the range of self-burning temperature of the particulates depending on the adhering amount of the particulates. When the adhering amount of the particulates is in excess and the temperature of the trapping member 54 is within the range of self-burning temperature of the particulates, the computer 62 ascertains that the trapper 51 is required to be regenerated and that combustion can be propagated to the particulates which have adhered to the trapping member 54. Here, when the adhering amount of the particulates is not in excess and/or the temperature of the trapping member 54 does not reach the range of self-burning temperature of the particulates, the trapper 51 is not regenerated and remains in use. When the temperature of the trapping member 54 does not reach the range of self-burning temperature of the particulates, the trapping member 54 may be heated through operational control of the diesel engine.

When the necessity for regenerating the trapper 51 and the possibility of propagating combustion to the particulates are ascertained, the computer 62 moves the secondary air feeding housing 55 and the electric heater 59 to an advanced position where the electric heater 59 abuts against the front of the trapping member 54 disposed at the inlet side by the actuator 56, and turns the electric heater 59 on through the heater controller 61. Since the electric heater 59 is relieved from the influence of the exhaust gas flow by the secondary air feeding housing 55, the electric heater 59 elevates only the temperature of the trapping member 54 being in contact therewith in the heated section to above 600 (°C.) which is the range of igniting temperature of the particulates, whereby a large igniting energy necessary for propagating combustion to the trapping member 54 in the heated section.

As described above, when the temperature sensor 66 detects that the trapping member 54 in the heated location has reached the range of igniting temperature of the particulates through the heating by the electric heater 59, the computer 62 drives the second air feeding pump 58 to supply the secondary air to the inlet side of the trapping member 54, whereby the particulates which have adhered to the trapping member 54 at the inlet side are ignited. The electric heater 59 is turned off when the secondary air is supplied.

The supply of the secondary air to the trapping member 54 disposed at the inlet side, which has been heated to the range of igniting temperature of the particulates subjects the particulates disposed in that location to a rapid oxidation and burning. When the particulates in that location generates heat, this combustion heat and the secondary air being continuously supplied are conveyed to the trapping member 54 disposed downstream thereof, and combustion is successively propagated to the particulates which have adhered to the trapping member 54 disposed downstream and are within the self-burning temperature thereof.

As described above, the burning of the particulates which have adhered to the trapping member 54 is successively propagated in a surface scale from the inlet side to the outlet side. Thereafter, upon detecting the trapping member 54 disposed at the outlet side being burned beyond the region of igniting temperature of the particulates through the temperature sensor 67, the computer 62 stops driving the secondary air feeding pump 58 to interrupt the supply of the secondary air and restores the secondary air feeding housing 55 and the electric heater 59 from the advanced position to the receded position through the actuator 56, thus completing the regenerating operation of the trapper 51.

In the above-described third embodiment, the electric heater 59 for heating the trapping member 54 disposed at the inlet side is incorporated in the secondary air feeding housing 55 and the rear surface of the electric heater 59 is covered by the secondary air feeding housing 55, to thereby be relieved from the influence of the exhaust gas flow. As a result, not only during stopping operation but also during operation of the diesel engine the particulates can be burned by the heat of combustion of the particulates which have adhered to the trapping member 54.

Figure 9:
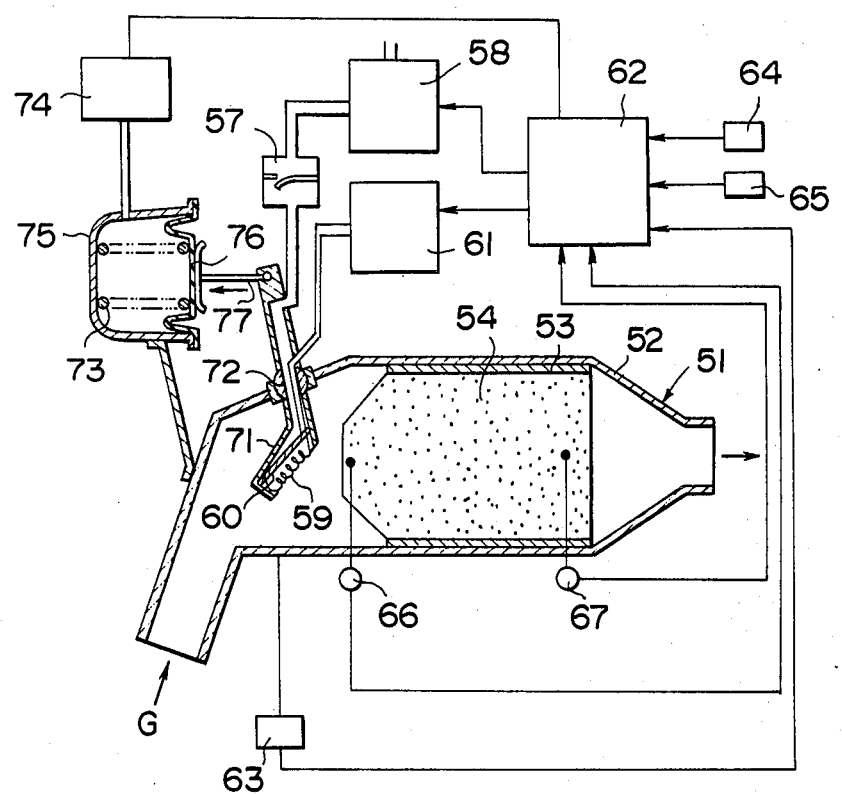
FIG. 9 is a diagram of piping showing a fourth embodiment of the present invention.

FIG. 9 is an explanatory view showing a fourth embodiment of the present invention. Same reference numerals as shown in the above-described third embodiment are used to designate same or similar members, so that detailed description thereof will be omitted. In this fourth embodiment, a difference from the above-described third embodiment resides in a driving mechanism for a secondary air feeding housing 71 incorporating therein an electric heater 59. The secondary air feeding housing 71 is rotatably supported at a spherical fulcrum 72 provided at the intermediate portion thereof by a trapper container 52. A driven end of the secondary air feeding housing 71 is connected through a link 77 to a diaphragm 76 of an actuator 75 incorporating therein springs 73 and connected to a vacuum pump 74. The secondary air feeding housing 71 is rotated about the fulcrum 72 through the vacuum pump 74 and the actuator 75 in response to an actuating command signal from a computer 62, and is rotatable from a receded position to an advanced position where the electric heater 59 can abut against the front surface of a trapping member 54 disposed at the inlet side as shown in FIG. 9.

In the above-described fourth embodiment, similarly to the third embodiment, the electric heater 59 abuts against the front surface of the trapping member 54 disposed at the inlet side under a condition where it is relieved from the exhaust gas flow by the secondary air feeding housing 71, so that a large igniting energy can be accumulated in the heated location thereof. Consequently, not only when the diesel engine is stopped in operation but also when the diesel engine is in operation, the particulates can be regenerated by the self-burning heat of the particulates which have adhered to the trapping member 54.

Figure 10:
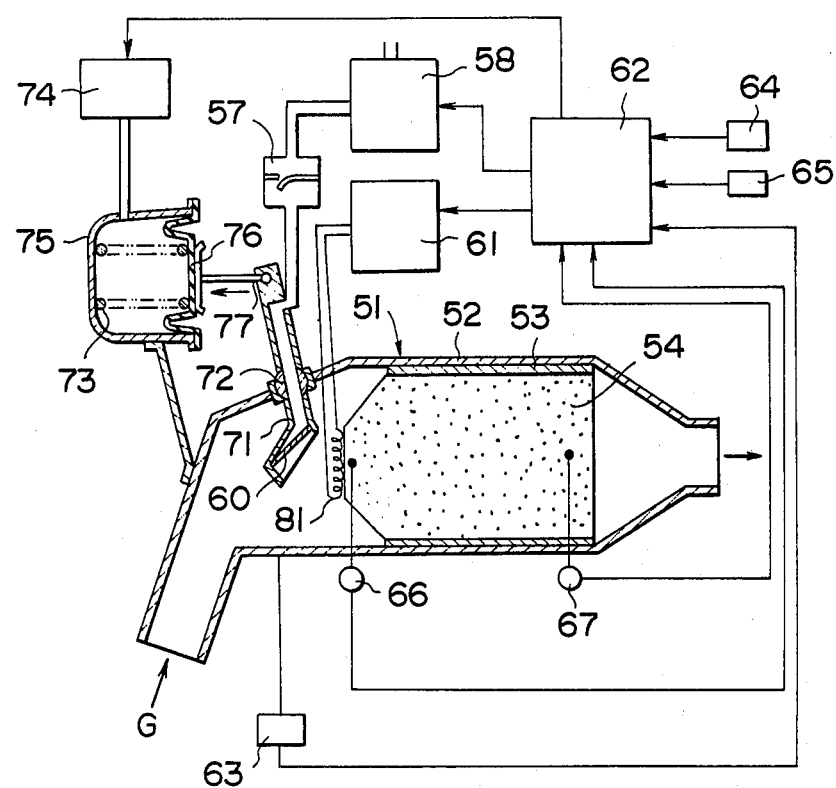
FIG. 10 is a diagram of piping showing a fifth embodiment of the present invention.

FIG. 10 is an explanatory view showing a fifth embodiment of the present invention. Same reference numerals as shown in the above-described fourth embodiment are used to designate same or similar members, so that detailed description thereof will be omitted. In this fifth embodiment, a difference from the above-described fourth embodiment resides in that an electric heater 81 is separated from a secondary air feeding housing 71 and the electric heater 81 is fixed in contact with the front of a trapping member 54 disposed at the inlet side. In the above-described fifth embodiment, the rear surface of the electric heater 81 is covered by the secondary air feeding housing 71 driven by an actuator 75 while heating the trapping member 54, whereby the electric heater 81 is relieved from the influence of the exhaust gas flow. As a result, not only when the diesel engine is stopped in operation but also when the diesel engine is in operation, the particulates can be regenerated by the heat of self-burning of the particulates which have adhered to the trapping member 54.

In the respective embodiments described above, description has been given of the case where the amount of the particulates which have adhered to the trapping member 54 is indirectly detected based on the measured value of the backpressure sensor, however, the adhering amount of the particulates may be indirectly detected through calculation of the memory of the rotational speed ranges and the aggregation of the transit distance of the vehicle, or the like, not through the detected value from the backpressure sensor. Furthermore, the respective embodiments described above are applicable to the diesel engines other than those mounted on the vehicles.

As has been described above, the method of and the apparatus for reducing emitted amount of particulates contained in the exhaust gas of a diesel engine according to the present invention can offer such an advantage that the particulates can be burned by the heat of self-burning of the particulates which have adhered to the trapping member.

What is claimed is:

1. A method of reducing an emitted amount of particulates by introducing the exhaust gas from a diesel engine into a trapper and causing the particulates to adhere to a trapping member in said trapper, comprising the following steps in the sequence set forth:
   detecting that the amount of the particulates which have adhered to said trapping member exceeds a predetermined value;
   detecting that a temperature of said trapping member is within a range of self-burning temperature of the particulates relative to said adhering amount of the particulates;
   heating an inlet part of said trapping member in said trapper to a range of igniting temperature of the particulates;
   supplying secondary air to said trapper to ignite the particulates which have adhered to the inlet part of said trapping member;
   and
   stopping said heating of the inlet part of said trapping member;
   whereby combustion of the particulates at the inlet part of said trapping member is propagated to the particulates which have adhered to an outlet part of said trapping member, to thereby regenerate said trapper.

2. A method of reducing an emitted amount of particulates as set forth in claim 1, further comprising the step of ascertaining that the engine is stopped before the step of heating the inlet part of said trapping member in said trapper to a range of igniting temperature of the particulates.

3. A method of reducing am emitted amount of particulates as set forth in claim 1, further comprising the steps of:
   detecting the temperature of the outlet part of said trapping member being within the range of igniting temperature of the particulates; and
   interrupting the supply of said secondary air.

4. A method of reducing an emitted amount of particulates as set forth in claim 1, wherein said trapping member is divided into more than two sections, and said exhaust is introduced into one of said sections further comprising the steps of:
   interrupting the flow of said exhaust gas into said one section of said trapping member and introducing said exhaust gas into another section of said trapping member before the step of heating the inlet part of one section of said trapping member, to thereby regenerate said one section of said trapping member.

5. Apparatus for reducing an emitted amount of particulates by introducing the exhaust gas from a diesel engine into a trapper and causing the particulates to adhere to a trapping member in said trapper, comprising:
   adhering amount detecting means for detecting that the amount of the particulates which have adhered to said trapping member exceeds a predetermined value;
   temperature detecting means for detecting that a temperature of said trapping member is within a range of self-burning temperature of the particulates relative to said adhering amount of the particulates;

heating means for heating an inlet part of said trapping member in said trapper to a range of igniting temperature of the particulates;

secondary air feeding means for supplying secondary air into said trapper to ignite the particulates which have adhered to the inlet part of said trapping member; and control means including means for receiving signals from said adhering amount detecting means and said temperature detecting means, and operating said heating means when the adhering amount of the particulates is in excess of said predetermined value and the temperature of the trapping member is within said range of self-burning temperature;

whereby combustion of the particulates at the inlet part of said trapping member is propagated to the particulates which have adhered to an outlet part of said trapping member, to thereby regenerate said trapper.

6. Apparatus for reducing an emitted amount of particulates as set forth in claim 5, wherein said control means ascertains the temperature of the inlet part of said trapping member is within the range of igniting temperature of the particulates before operating said secondary air feeding means.

7. Apparatus for reducing an emitted amount of particulates as set forth in claim 5, wherein said control means stops the engine operation when the adhering amount of the particulates is in excess of the predetermined value and the trapping member is within the range of self-burning temperature of the particulates.

8. Apparatus for reducing an emitted amount of particulates as set forth in claim 5, wherein said trapping member is divided into at least two sections.

9. Apparatus for reducing an emitted amount of particulates as set forth in claim 8, further comprising a change-over valve for isolating one section of said trapping member to which the particulates adhere in excess of the predetermined value from an exhaust gas flow course for regenerating said section and communicating the other section of said trapping member with the exhaust gas flow course.

10. Apparatus for reducing an emitted amount of particulates as set forth in claim 5, further comprising:

a secondary air feeding housing with said heating means at an end opposed to said surface of said trapping member, said secondary air feeding housing protecting said heating means from the exhaust gas flow and being capable of advancing to or receding from said trapping member; and an actuator for moving said secondary air feeding housing back and forth.

11. Apparatus for reducing an emitted amount of particulates as set forth in claim 10, wherein said secondary air feeding housing is rectilinearly movable back and forth by said actuator.

12. Apparatus for reducing an emitted amount of particulates as set forth in claim 10, wherein said secondary air feeding housing is rotatable and movable back and forth by said actuator.

13. Apparatus for reducing an emitted amount of particulates as set forth in claim 5, wherein said heating means is fixed in front of said trapping member, said apparatus further comprising:

a secondary air feeding housing capable of advancing to or receding from said trapping member, said secondary air feeding housing protecting said heating means from the exhaust gas flow when advancing to said trapping member; and an actuator for moving said secondary air feeding housing back and forth.

* * * * *